US008240752B2

(12) United States Patent
Katayama et al.

(10) Patent No.: US 8,240,752 B2
(45) Date of Patent: Aug. 14, 2012

(54) HOLDING STRUCTURE OF GUIDE PIPE OF SUNROOF APPARATUS

(75) Inventors: Hajime Katayama, Sakura (JP); Ayumi Mihashi, Sakura (JP)

(73) Assignee: Yachiyo Industry Co., Ltd., Sayama-shi (JP)

( * ) Notice: Subject to any disclaimer, the term of this patent is extended or adjusted under 35 U.S.C. 154(b) by 0 days.

(21) Appl. No.: 13/030,559

(22) Filed: Feb. 18, 2011

(65) Prior Publication Data

US 2011/0198891 A1 Aug. 18, 2011

(30) Foreign Application Priority Data

Feb. 18, 2010 (JP) ................................ 2010-033267

(51) Int. Cl.
*B60J 7/00* (2006.01)

(52) U.S. Cl. ................................ 296/216.08; 74/502.4

(58) Field of Classification Search ..... 296/216.01–224; 74/502.4, 502.6

See application file for complete search history.

(56) References Cited

U.S. PATENT DOCUMENTS 4,749,227 A * 6/1988 Bienert et al. ................ 296/221

FOREIGN PATENT DOCUMENTS

JP 2006-168531 * 6/2006
JP 2009-234337 10/2009

* cited by examiner

*Primary Examiner* — Dennis Pedder
(74) *Attorney, Agent, or Firm* — Rankin, Hill & Clark LLP

(57) ABSTRACT

A holding structure of a guide pipe of a sunroof apparatus is provided in which a guide pipe is difficult from being removed. In a frame 12 of the sunroof apparatus in which a guide pipe 25L covering a cable 22 is arranged, a bank part 601 extending obliquely upward from one of the sidewalls 502 of the guide groove 51L is formed on the one of the sidewalls, and a bottom portion 501 of the guide pipe groove 51L comes in surface contact with the outer circumferential surface of the lower part of the guide pipe 25L and the bank part 601 comes in surface contact with the outer circumferential surface of the upper part of the guide pipe 25L.

8 Claims, 7 Drawing Sheets

51L(51Lb)
25L(25Lb)
51R(51Ra)
25R(25Ra)
51L(51La)
25L(25La)
51R(51Rb)
25R(25Rb)
61
62
71
22R
22L
36R
37R
11R
36L
37L
11L
12
51L
51R
24
4
23
42
43
44
I

HOLDING STRUCTURE OF GUIDE PIPE OF SUNROOF APPARATUS

CROSS REFERENCE TO RELATED APPLICATIONS

This application claims the foreign priority benefit under 35 U.S.C. §119 of Japanese Patent Application No. 2010-33267 filed on Feb. 18, 2010, the disclosure of which is incorporated herein by reference.

BACKGROUND OF THE INVENTION

1. Field of the Invention

The present invention relates to a holding unit of a guide pipe of a sunroof apparatus of a vehicle.

2. Description of the Related Arts

As a sunroof apparatus provided to an opening of the roof of a vehicle, a structure disclosed, for example, in Japanese Unexamined Patent Application Publication No. 2009-234337 has been known. The sunroof apparatus disclosed in Japanese Unexamined Patent Application Publication No. 2009-234337 mainly includes a pair of guide rails, a frame which connects ends of the guide rails, a sunroof panel which is moved along the guide rails, a driving device which moves the sunroof panel, and a cable which connects the driving device and the sunroof panel.

The cable connects a slider provided to the sunroof panel and the driving device provided to the frame. The cable is laid along the opening of the roof from the guide rail to the frame. At the outside of the guide rail, the outer circumferential surface of the cable is covered by a guide pipe. By covering the cable with the guide pipe, the cable is protected from a dust or water and is also prevented from being bent.

As the guide pipe may come in contact with the frame due to the vibration of the vehicle, the guide pipe has to be held to the frame. In order to solve the problem, a structure can be considered in which a recessed groove 102 is formed in the frame 101 and a guide pipe 104 covering the cable 103 is arranged in the recessed groove 102 as shown in FIG. 7. However, since the upper part of the recessed groove 102 is opened in this structure, the guide pipe 104 may still be removed from the recessed groove 102 when external force is applied to the frame 101. Thus, another structure can be considered in which a pair of engaging claw parts for holding the guide pipe is provided in a portion of the frame to hold the guide pipe in the frame, as shown in FIG. 4 of Japanese Unexamined Patent Application Publication No. 2009-234337, for example.

However, even in the structure in which the engaging claw parts are provided, there still is a problem that the guide pipe is likely to be removed when external force is applied since the outer circumferential surface of the guide pipe only comes in line contact with the distal end of the engaging claw part. Especially, at a part of the frame where the recessed groove for accommodating the guide groove is curved, the guide pipe is likely to be removed from the outer edge of the recessed groove since the guide pipe is strongly pressed to the outer edge of the recessed groove when external force is applied to the frame.

SUMMARY OF THE INVENTION

The present invention is made in view of the above problem, and an object of the present invention is to provide a holding structure of the guide pipe of the sunroof apparatus in which the guide pipe is difficult to be removed from the frame.

A first aspect of the present invention provides a holding structure of a guide pipe of a sunroof apparatus, the sunroof apparatus including a pair of guide rails which is provided to opposite sides of an opening of a vehicle in a width direction of the opening and guides the movement of a sunroof panel; a frame which connects ends of the guide rails; a driving unit which moves the sunroof panel; at least one cable which connects the driving unit and the sunroof panel; at least one guide pipe which is arranged in a guide pipe groove recessed in the frame and covers the at least one cable; wherein a bank part is formed extending obliquely upward from one of side walls of the guide pipe groove, and a bottom part of the guide pipe groove corresponding to the bank part comes in surface contact with an outer circumferential surface of a lower part of the guide pipe and the bank part comes in surface contact with a part of an outer circumferential surface of an upper part of the guide pipe.

In the aforementioned holding structure of the guide pipe of the sunroof apparatus the bank part is preferably formed on an outer edge of the guide pipe groove which is formed to be curved.

In the aforementioned holding structure of the guide pipe of the sunroof apparatus it is preferable that an inclined surface inclined in a direction in which an opening of the guide pipe groove becomes larger is formed on the other one of the side walls, and the at least one guide pipe is arranged in the guide pipe groove through the opening of the guide pipe groove between the bank part and the inclined surface.

Further, in the aforementioned holding structure of the guide pipe of the sunroof apparatus, it is preferable that a pair of cutout areas which divide the guide pipe groove is formed on opposite sides of the guide pipe groove corresponding to the bank part in a longitudinal direction of the guide pipe groove, a slit is formed along the longitudinal direction of the guide pipe groove corresponding to the bank part, and the guide pipe groove elastically holds the guide pipe by the pair of cutout areas and the slit.

PREFERRED EMBODIMENT OF THE PRESENT INVENTION

Figure 1:
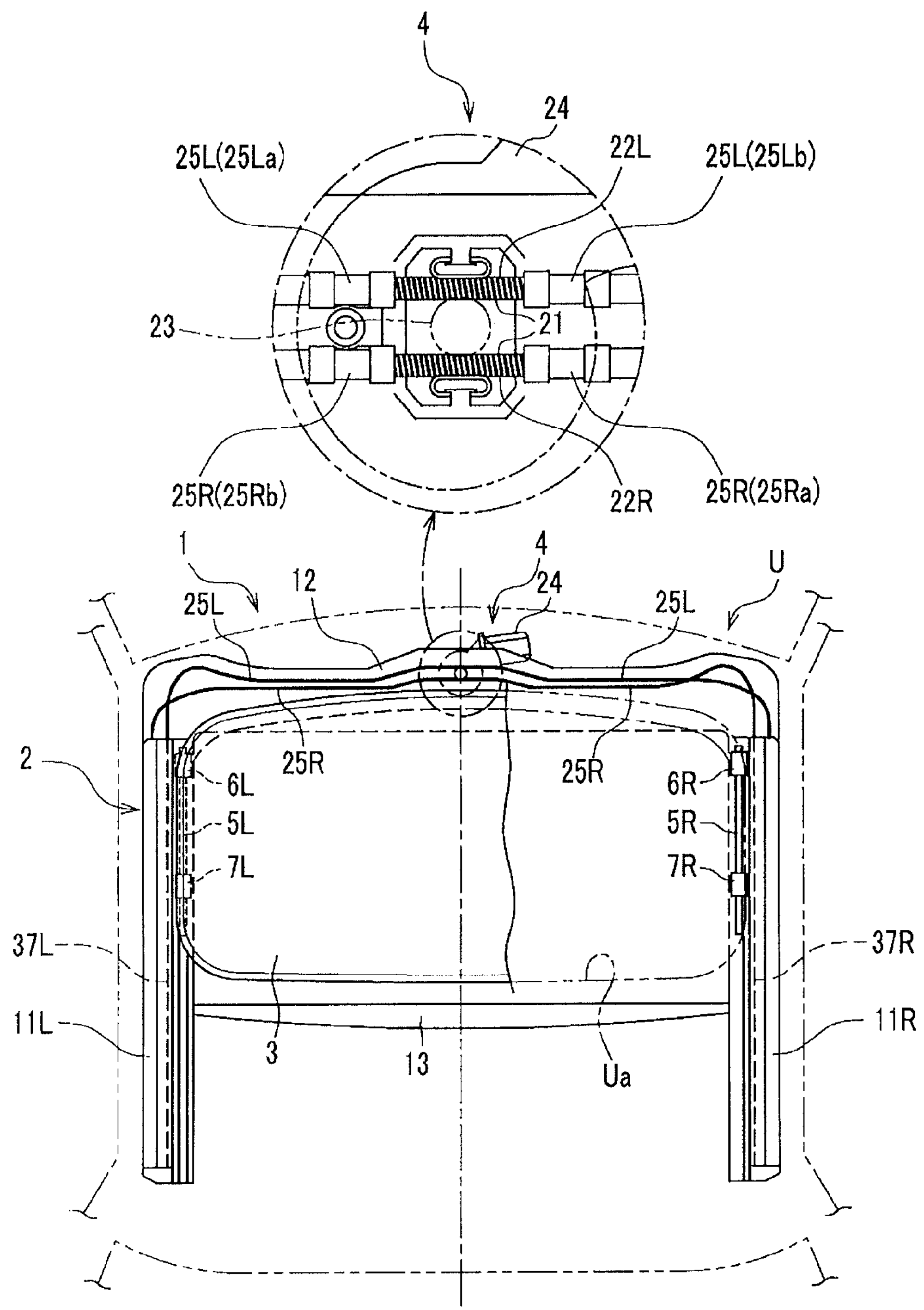
FIG. 1 is a plain view of a sunroof apparatus according to an embodiment of the present invention.

An embodiment of the present invention is described in detail with reference to the accompanying drawings as appropriate. As shown in FIG. 1, a sunroof apparatus 1 according to the embodiment is attached to an opening Ua of a roof U of a vehicle. The directions of up-down, left-right, and front-rear in the following explanation correspond to those seen from a driver of the vehicle. Members which are provided on left and right sides of the sunroof apparatus 1 as a pair or members which functionally correspond to those members are assigned L or R, which indicates left or right, after similar reference numerals to differentiate the left member and the right member. Taking the guide rails for example, the left side guide rail is referred to as the guide rail 11L and the right side guide rail is referred to as the guide rail 11R. When the guide rail 11L and the guide rail 11R are collectively referred to, they are referred to as the guide rail 11. Firstly, the entire structure and the operation of the sunroof apparatus 1 are described.

The sunroof apparatus 1 mainly includes a sunroof frame 2 attached to the roof U such that the sunroof frame 2 surrounds the opening Ua, a sunroof panel 3 which is slid in the front-rear direction of the sunroof frame 2 to open/close the opening Ua, a driving device 4 which drives the sunroof panel 3 to be opened or closed, a pair of cables 22 (22L, 22R) which connects the sunroof panel 3 and the driving device 4, and a pair of guide pipes 25 (25L, 25R) through which the cables 22 are inserted.

The sunroof frame 2 includes left and right guide rails 11L, 11R which are provided opposite sides of the opening Ua in the width direction of the vehicle and extend in the front-rear direction of the vehicle; a front frame 12 which connects front ends of the guide rails 11L, 11R, and a center frame 13 which connects the center portions of the left and right guide rails 11L, 11R. Cable grooves 37L, 37R for guiding the cables 22L, 22 are formed in the left and right guide rails 11L, 11R, respectively, over their length.

Figure 2:
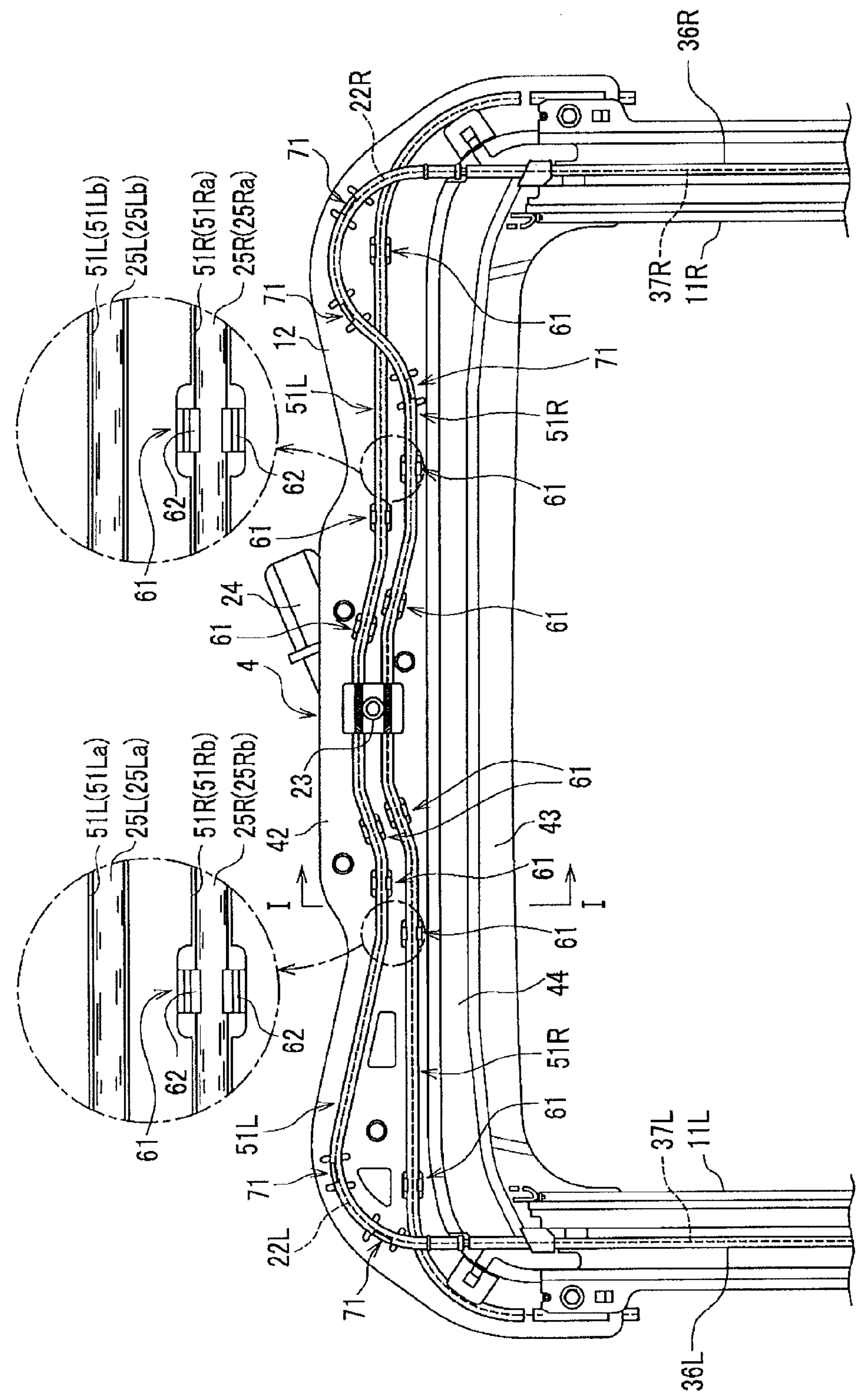
FIG. 2 is an enlarged plain view showing a front frame and a guide rail according to the embodiment.
Figure 3:
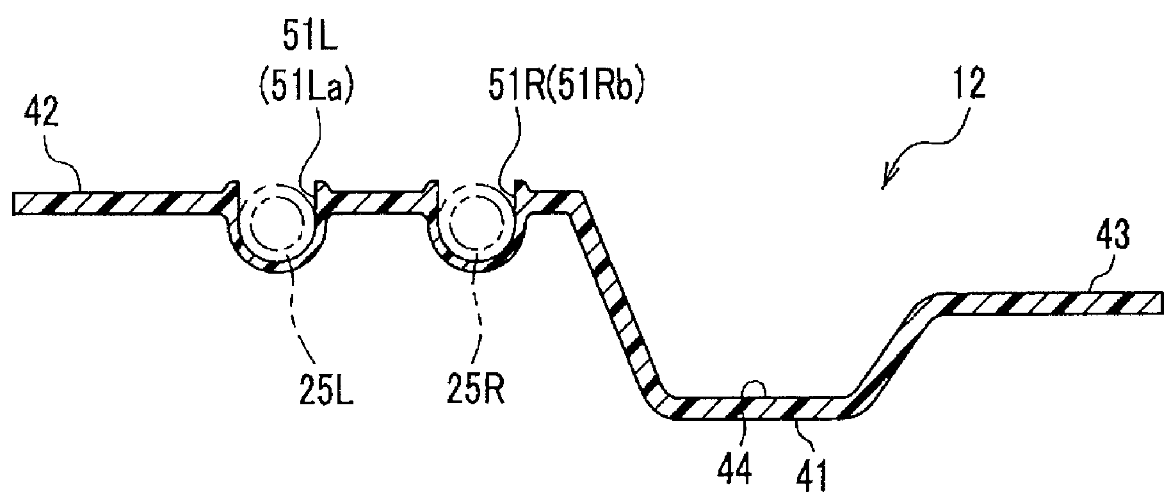
FIG. 3 is a cross sectional view along the line I-I shown in FIG. 2.

As shown in FIG. 2, the front frame 12 is a member which is connected to the guide rails 11L, 11R perpendicularly to the guide rails 11L, 11R from the front sides of the guide rails 11L, 11R. The left and right ends of the front frame 12 are curved and have a shape of substantially up-side down U shape in a plain view. As shown in FIG. 3, the front frame 12 includes a bottom plate portion 41, a plate-like portion 42 which is formed in front of the bottom plate portion 41, and a plate-like portion 43 which is formed in the rear of the bottom plate portion 41.

The bottom plate portion 41 is formed a step lower than the plate-like portion 42 and the plate-like portion 43. With this structure, a drain groove 44 whose bottom is the bottom plate portion 41 is formed in the front frame 12. The drain groove 44 extends in the length direction of the front frame 12 and is also formed continuously in both sides of the front frame 12 in the front-rear direction.

As shown in FIGS. 2 and 3, a guide pipe groove 51L in which the guide pipe 25L is disposed and a guide pipe groove 51R in which the guide pipe 25R is disposed are formed in the plate-like portion 42. The guide pipe grooves 51L, 51R both have a U shape in a cross sectional view.

As shown in FIG. 1, the sunroof panel 3 includes panel brackets 5L, 5R along its left and right edges and a pair of front sliders 6L and 6R and a pair of rear sliders 7L and 7R which are provided to the panel brackets 5L, 5R. The front sliders 6L and 6R and the rear sliders 7L and 7R are provided to the guide rail 11 such that the front sliders 6L and 6R and the rear sliders 7L and 7R are slidable in the guide rail 11. The rear sliders 7L and 7R are connected to the panel bracket 5 through a known cam mechanism. The rear sliders 7L and 7R tilt the sunroof panel 3 by relative movement to the panel bracket 5 or engage with the panel bracket 5 to move the sunroof panel 3 in the front-rear direction.

As shown in FIG. 1, the driving device 4 mainly includes a driving gear 23 disposed on the lower surface of the front frame 12 and is meshed with gears (driven gears 21) of cables 22, and a motor 24 which rotates and drives the driving gear 23 through a speed reduction mechanism (not shown).

As shown in FIGS. 1 and 2, one end of each of the cables 22 (22L, 22R) is connected to the rear part slider 7L or 7R, and the other end of each of the cables 22 is connected to the driving device 4, and the cable 22 includes the driven gear 21 which is formed by winding wires around the outer circumferential surface of steel flexible body. The cable 22 is a push-pull cable which pushes or pulls the sunroof panel 3 by the operation of the driving device 4. The cables 22 are laid along the outer circumference of the opening Ua of the roof U. The cables 22 are linearly guided along the cable grooves 37L, 37R in the guide rail 11. Parts of the cables 22 between the meshing part of the driving gear 23 and the guide rail 11 are guided by a pair of guide pipes 25 (25L, 25R) and a pair of the guide pipe grooves 51 (51L, 51R) which are provided in the front frame 12.

As shown in FIGS. 1 and 2, the guide pipe 25L is a cylindrical member covering the cable 22L which connects the driving device 4 and the left side rear part slider 7L (see FIG. 1). Although the material of the guide pipe 25L is not limited, the guide pipe 25L is formed of resin in the embodiment. The guide pipe 25L includes a drive guide pipe part 25La which guides the cable 22 to the side of the guide rail 11L and an idle guide pipe part 25Lb through which the free end of the cable 22L is inserted.

As shown in FIG. 2, the guide pipe 25L is received in the guide pipe groove 51L which is recessed in the front frame 12. The guide pipe groove 51L includes a drive guide pipe groove 51La which holds the drive guide pipe part 25La and an idle guide pipe groove 51Lb which holds the idle guide pipe part 25Lb.

As shown in FIGS. 1 and 2, the guide pipe 25R is also a cylindrical member covering the cable 22R which connects the driving device 4 and the right side rear part slider 7R (see FIG. 1). Although the material of the guide pipe 25R is not limited, the guide pipe 25R is formed of resin in the embodiment. The guide pipe 25R includes a drive guide pipe part 25Ra which guides the cable 22 to the side of the guide rail 11R and an idle guide pipe part 25Rb through which the free end of the cable 22R is inserted.

As shown in FIG. 2, the guide pipe 25R is received in the guide pipe groove 51R which is recessed in the front frame 12. The guide pipe groove 51R includes a drive guide pipe groove 51Ra which holds the drive guide pipe part 25Ra and an idle guide pipe groove 51Rb which holds the idle guide pipe part 25Rb.

The guide pipes 25 formed as described above protects the cables 22 from a dust or water and regulates the deflection of the cables 22 when the cable 22 is pushed or pulled by the driving gear 23. The cables 22L, 22R face to each other in parallel at the parts of the cables 22L, 22R which are meshed with the driving gear 23 and synchronously push or pull the rear sliders 7L and 7R in accordance with the rotation of the driving gear 23.

The sunroof apparatus 1 is configured such that the upper surface of the sunroof panel 3 is flush with the roof U of the vehicle when the sunroof panel 3 is fully closed. When the driving gear 23 is driven and the cables 22 are pushed, the rear end of the sunroof panel 3 is tilted up such that the rear end of the sunroof panel 3 rises above the roof U by the cum mechanism of the rear part slider 7, or the sunroof panel 3 is opened in accordance with the movement of the rear slider 7. On the other hand, when the cables 22 are pulled, the rear end of the sunroof panel 3 is tilted down, or the sunroof panel 3 is closed in accordance with the movement of the rear slider 7.

Next, the configuration of the guide pipe grooves 51L, 51R in the embodiment is described in more detail. As shown in FIG. 2, a plurality of clip units 61 is formed at the linear portions of the guide pipe grooves 51L, 51R, and a plurality of holding units 71 is formed at the curved portions of the guide pipe grooves 51L, 51R. With the clip units 61 and the holding units 71, the guide pipes 25L, 25R can be fixed to the guide pipe grooves 51L, 51R, respectively. Five clip units 61 and two holding units 71 are formed in the guide pipe groove 51L in the embodiment. In the guide pipe groove 51R, five clip units 61 and three holding units 71 are formed. Taking the guide pipe groove 51L (drive guide pipe groove 51La) for example, the structures of the clip unit 61 and the holding unit 71 are described below.

Figure 4A:
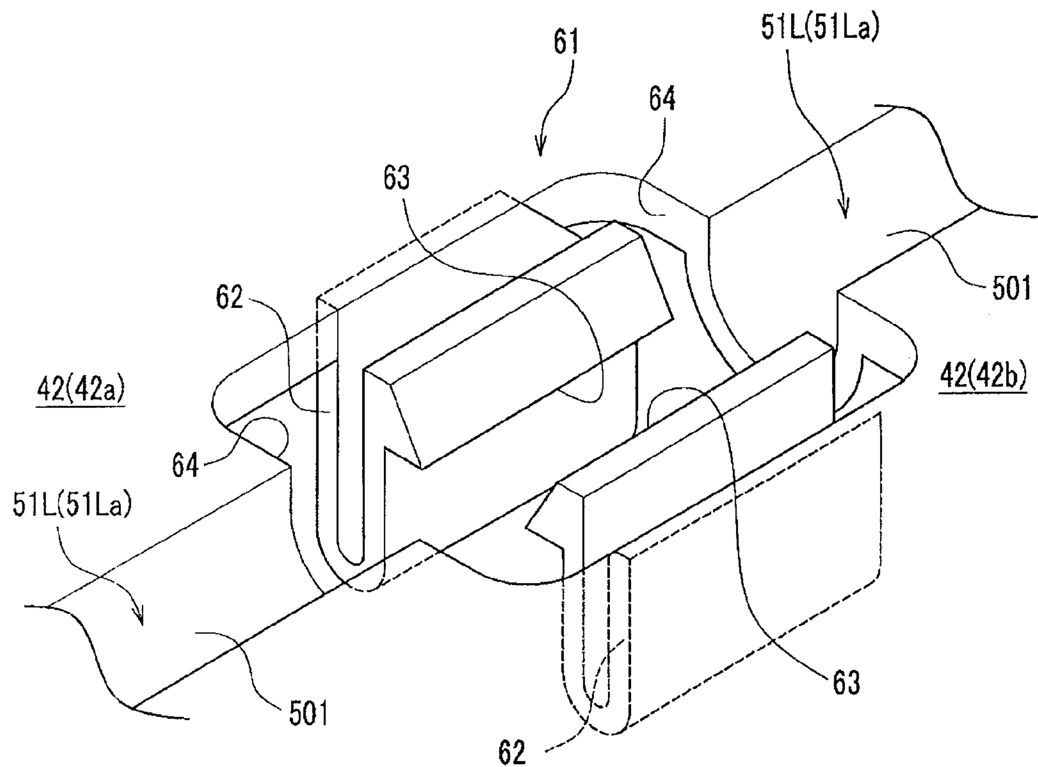
FIG. 4A is a perspective view showing a clip unit according to the embodiment.

As shown in FIG. 4A, the clip unit 61 is formed in a part of the guide pipe groove 51L and is comprised of engaging claw parts 62, 62 that have the same shape. The engaging claw parts 62, 62 are formed in the plate-like portion 42*a* disposed in front of the guide pipe groove 51L and the plate-like portion 42*b* disposed in the rear of the guide pipe groove 51L, respectively. The engaging claw parts 62, 62 are arranged with a predetermined gap between them. The engaging claw part 62 has a U shape in a cross-section and is formed to be flexibly deformable in the groove width direction. Formed at the distal end of the engaging claw part 62 is a claw part 63. Cutout areas 64, 64 that divide the guide pipe groove 51L are also formed at the opposite sides of the engaging claw part 62 in the groove length direction.

Figure 4B:
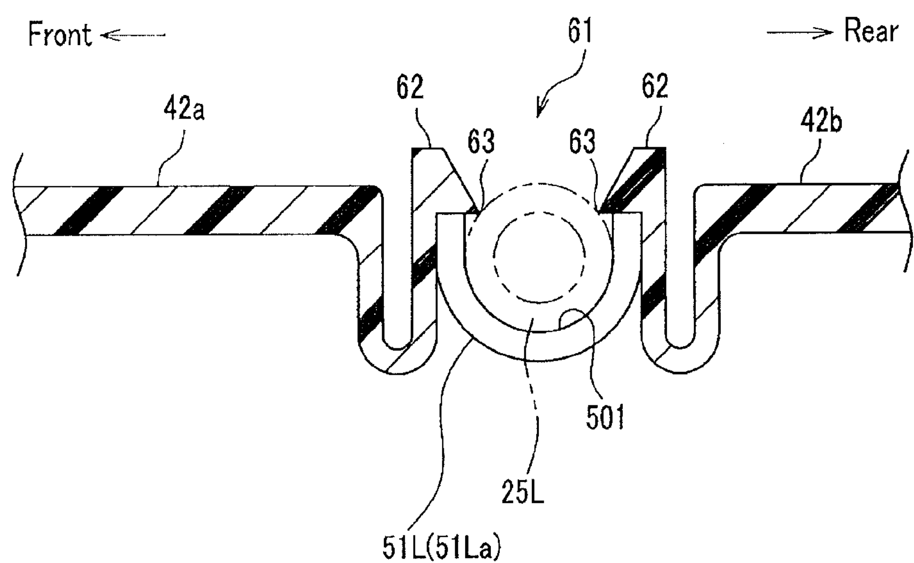
FIG. 4B is a cross sectional view showing the clip unit according to the embodiment.

As shown in FIG. 4B, when the guide pipe 25L is arranged in the clip unit 61, the guide pipe 25L is pressed (pushed) in the clip units 61 from the upper side of the engaging claw parts 62, 62 against the energizing force of the engaging claw parts 62, 62 until the upper surface of the guide pipe 25L comes in contact with the claw part 63. Thus, the upper part of the guide pipe 25L comes in line contact with the claw parts 63, 63 of the engaging claw parts 62, 62.

Figure 5A:
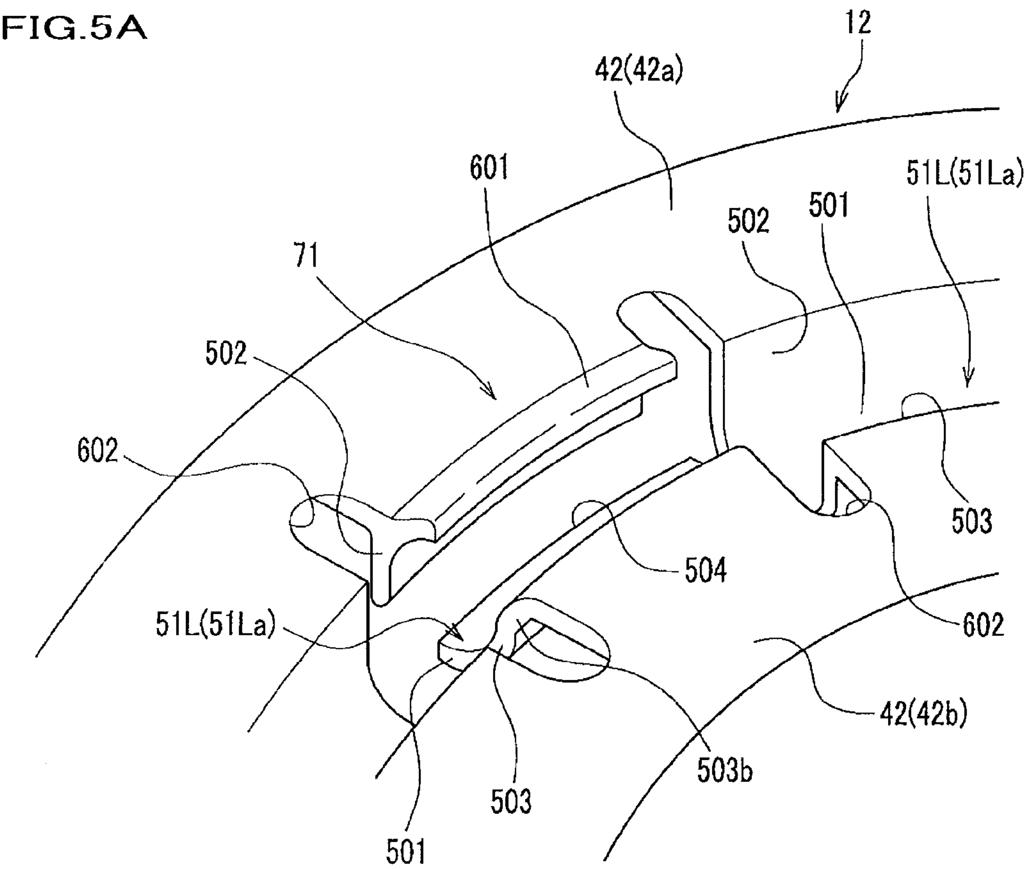
FIG. 5A is a perspective view showing a holding unit according to the embodiment.
Figure 5B:
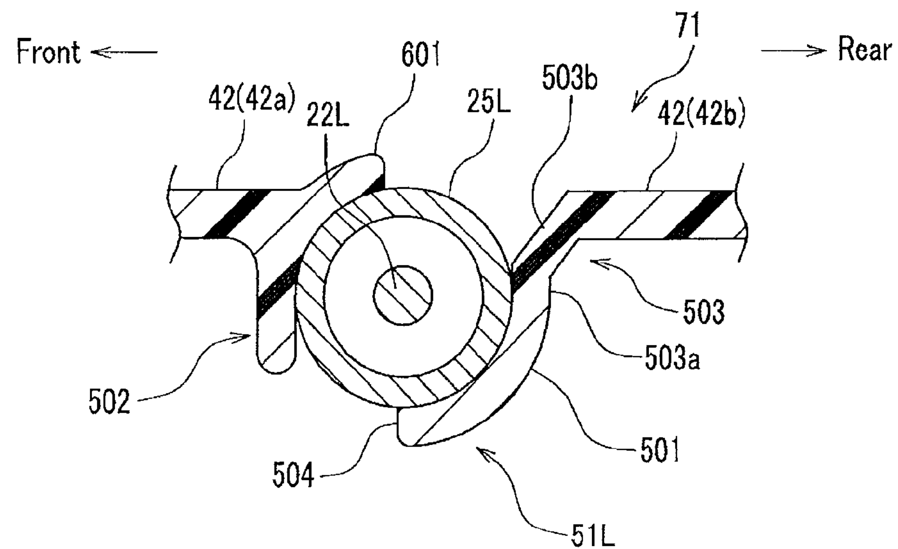
FIG. 5B is a cross sectional view showing the holding unit according to the embodiment.

As shown in FIGS. 5A and 5B, the holding unit 71 is comprised of the guide pipe groove 51L (51La) and a bank part 601. The guide pipe groove 51L includes a bottom portion 501, a front side wall 502 and a rear side wall 503.

The bottom portion 501 is a portion for holding the lower part of the guide pipe 25L. The inner surface of the bottom portion 501 is a curved surface and is formed in the same curvature radius as that of the outer circumference of the guide pipe 25L. The bottom portion 501 comes in surface contact with a portion of the outer circumferential surface of the lower part (lower half part) of the guide pipe 25L in the embodiment. In other words, the bottom portion 501 comes in surface contact with the guide pipe 25L on the rear side of the guide pipe 25L from an obliquely downward direction.

The side wall 502 extends downward from the plate-like portion 42*a* disposed in front of the guide pipe groove 51L. The inner surface of the side wall 502 and the guide pipe 25L come in contact with each other. The side wall 503 extends downward from the plate-like portion 42*b* which is in the rear of the guide pipe groove 51L. The side wall 503 includes, as shown in FIG. 5B, a wall portion 503*a* which is formed continuously with the bottom portion 501 and an inclined portion 503*b* having an inclined surface which is inclined rearward from the wall portion 503*a*.

The bank part 601 is formed along the outer edge of the curved guide pipe groove 51L and extends obliquely upward from the side wall 502. The inner surface of the bank part 601 is a curved surface and is formed in the same curvature radius as that of the outer circumferential surface of the guide pipe 25L. The bank part 601 is a part that comes in surface contact with at least a portion of the outer circumferential surface of the upper part (upper half part) of the guide pipe 25L. In other word, the bank part 601 comes in surface contact with the guide pipe 25L from an obliquely upward direction.

The distance between the bank part 601 and the inclined portion 503*b* and the inclination angle of the inclined portion 503*b* may be appropriately set such that the guide pipe 25L can be pressed into the holding unit 71.

The cutout areas 602, 602 that divide the guide pipe groove 51L are formed in the holding unit 71 of the embodiment at opposite sides of the part of the guide pipe groove 51L corresponding to the bank part 601 in the longitudinal direction of the guide pipe groove 51L. The cutout area 602 is also continuously formed in the plate-like portion 42*a* disposed in front of the guide pipe groove 51L and the plate-like portion 42*b* disposed in the rear of the plate-like portion 42*a*. The slit 504 is also formed in the holding unit 71 along the longitudinal direction of the part of the guide pipe groove 51L corresponding to the bank part 601. Thus, the bank part 601 becomes a free end, which allows the bank part 601 to be flexibly deformed with respect to the plate-like portion 42*a*. Further, the bottom portion 501 becomes also a free end, and thus the bottom portion 501 can be flexibly deformed with respect to the plate-like portion 42*b*.

As shown in FIG. 5B, when the guide pipe 25L is arranged in the holding unit 71, the guide pipe 25L is pressed into the holding unit 71 from the opening between the bank part 601 and the inclined portion 503*b*. The guide pipe 25L is guided by the inclined surface of the inclined portion 503*b* and is elastically held by the bottom portion 501 and the bank part 601.

Next, effects of the holding structure (the holding unit 71) of the guide pipe according to the embodiment are described. In the clip unit 61 (see FIGS. 4A and 4B), only the upper part of the guide pipe 25L comes in line contact with the claw part 63 of the engaging claw part 62, and the lower part of the guide pipe 25L is not supported at the part of the guide pipe groove 51L where the guide pipe groove 51L is divided. Thus, the holding force of the clip unit 61 is comparatively smaller at the portion of the guide groove 51L where the guide pipe groove 51L is divided, since the contact area of the clip unit 61 and the guide pipe 25L is small. In contrast, in the holding structure of the embodiment the contact area of the outer circumferential surface of the guide pipe 25L being in contact with the bottom portion 501 of the guide pipe groove 51L and the bank part 601 is secured large, whereby the holding power for holding the guide pipe 25L can be enhanced. Thus, the guide pipe 25L is difficult to be removed from the front frame 12.

Since the bank part 601 extends such that the bank part 601 covers the upper part of the guide pipe 25L, the guide pipe 25L can be prevented from being removed from the upper part of the guide pipe groove 51L.

At a curved portion of the guide pipe groove 51L accommodating the guide pipe 25L as in the present embodiment, a guide pipe is likely to be easily removed from the outer edge of the curved portion when the outer force is applied to the front frame 12. In accordance with the present embodiment, however, the guide pipe 25L is difficult to be removed since the bank part 601 is formed along the outer edge of the curved portion.

With the inclined portion 503*b*, an opening for arranging the guide pipe 25L can be secured large, which provides an excellent assemblability. Since the slit 504 and the cutout area 602 are formed, the guide pipe 25L can be elastically held. This makes it possible to assemble the guide pipe 25L into the guide pipe groove 51L more easily. Furthermore, the guide pipe 25L can be held with a good balance since the guide pipe 25L is held from the front obliquely upper direction and the rear obliquely lower direction in the present embodiment.

In a case where the holding unit 71 is provided to a portion of the guide pipe groove 51L which is curved in a S shape in a plain view, similarly to the guide pipe groove 51R shown in FIG. 2, the guide pipe 25R can be held with a good balance and made more difficult to be removed from the outer edge of the curved portion by providing the bank part 601 on the side of the outer edge of each curved portion.

Figure 6A:
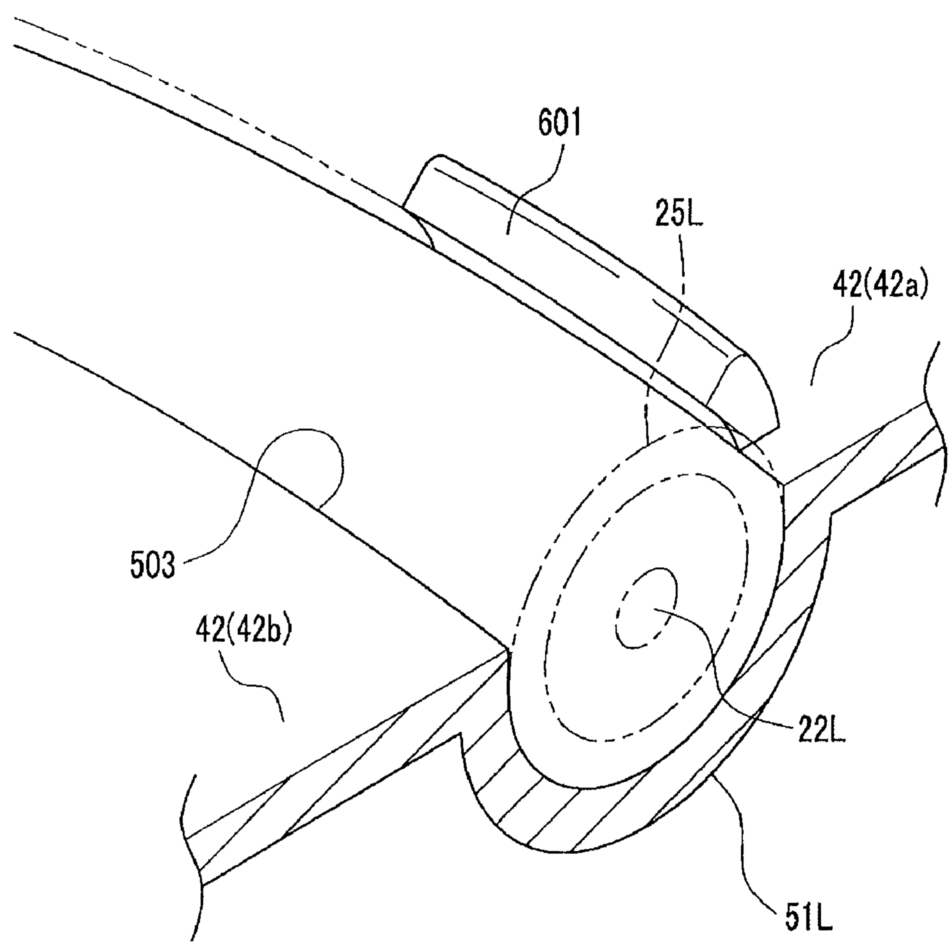
FIG. 6A is a perspective view of a holding unit according to another embodiment.
Figure 6B:
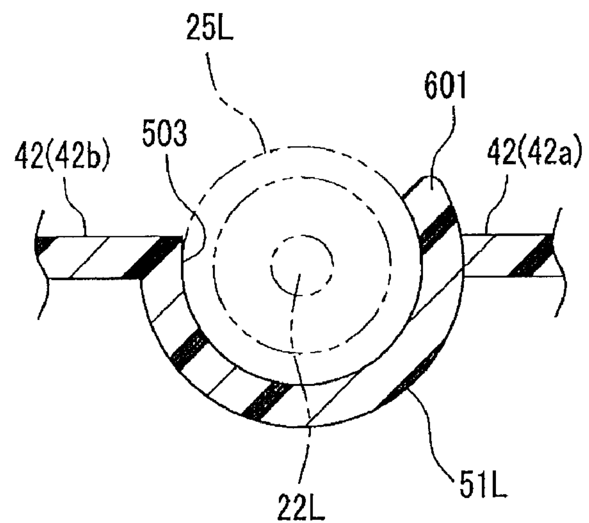
FIG. 6B is a cross sectional view showing the holding unit according to the another embodiment.
Figure 7:
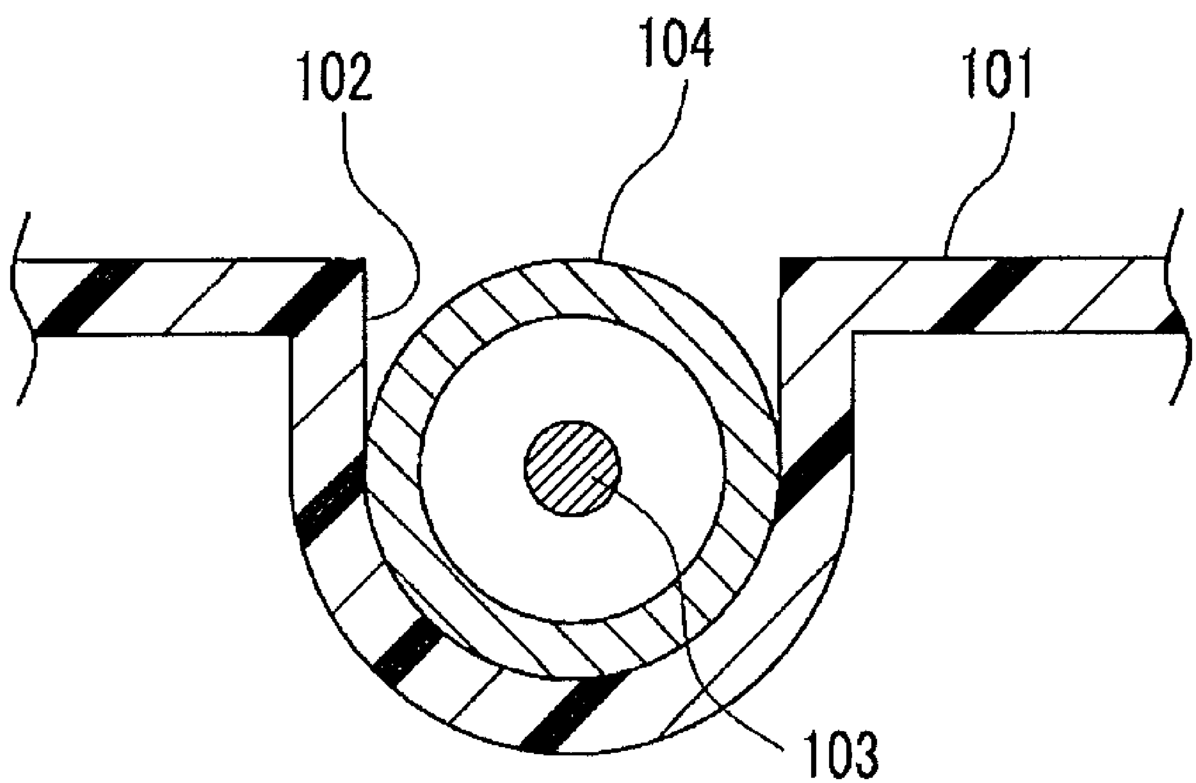
FIG. 7 is a cross sectional view for explaining a conventional art.

The embodiment of the present invention has been described above, however, the present invention may be modified appropriately as long as the modification does not deviate from the spirit of the invention. For example, the guide pipe 25L is arranged in the front frame 12 in the above described embodiment, however, if the guide pipe is arranged in a rear side frame, the holding units may be provided to the rear side frame. Further, the slit 504 and the cutout area 602 are provided in the above described embodiment, however, a slit and a cutout area may not be provided as shown in another embodiment in FIGS. 6A and 6B, for example. In this case, it is desirable to form an opening between the bank part 601 and the side wall 503 which is opposed to the bank part 601 to be comparatively larger in consideration of the assemblability of the guide pipe 25.

In the embodiment, the holding units 71 (the bank part 601) are provided only at the curved portions of the guide pipe grooves 51L, 51R, however, the holding units 71 may also be provided to the linear portions of the guide pipe grooves 51L, 51R. The numbers of the holding units 71 and the clip units 61 to be provided and the positions thereof may be appropriately determined in accordance with the shape of the front frame 12 or the shape of the guide pipe grooves 51L, 51R.

What is claimed is:

1. A holding structure of a guide pipe of a sunroof apparatus, the sunroof apparatus comprising:

a pair of guide rails that are provided on opposite sides of an opening of a vehicle in a width direction of the opening and guide the movement of a sunroof panel;

a frame that connects ends of the guide rails, said frame having a plate-shaped portion in which a guide pipe groove is formed, said frame further including a side wall that extends downwardly from said plate-shaped portion and serves to define said guide pipe groove, said guide pipe groove being upwardly open and recessed relative to said plate-shaped portion, said guide pipe frame further providing a bank part that is integral with said plate-shaped portion and extends obliquely upwardly from the side wall so as to extend relatively above said plate-shaped portion;

a driving unit that moves the sunroof panel;

at least one cable that connects the driving unit and the sunroof panel;

at least one guide pipe that is partially received in the guide pipe groove such that a lower portion of said guide pipe is received within said guide pipe groove while an upper portion of said guide pipe projects from said guide pipe grove and extends above said plate-shaped portion, said guide pipe covering the at least one cable; wherein an upwardly facing surface of a bottom part of the side wall diametrically opposed to the bank part comes in surface contact with an outer circumferential surface of a lower part of the guide pipe and the bank part comes in surface contact with an upper part of the guide pipe outer circumferential surface.

2. The holding structure of the guide pipe of the sunroof apparatus according to claim 1, wherein the bank part is formed on an outer edge of the guide pipe groove which is formed to be curved.

3. The holding structure of the guide pipe of the sunroof apparatus according to claim 1, wherein an inclined surface which is inclined in a direction in which an opening of the guide pipe groove becomes larger is formed on the other one of the side walls, and the at least one guide pipe is arranged in the guide pipe groove through the opening of the guide pipe groove between the bank part and the inclined surface.

4. The holding structure of the guide pipe of the sunroof apparatus according to claim 2, wherein an inclined surface which is inclined in a direction in which an opening of the guide pipe groove becomes larger is formed on the other one of the side walls, and the at least one guide pipe is arranged in the guide pipe groove through the opening of the guide pipe groove between the bank part and the inclined surface.

5. A holding structure of a guide pipe of a sunroof apparatus, the sunroof apparatus comprising:

a pair of guide rails which is provided to opposite sides of an opening of a vehicle in a width direction of the opening and guides the movement of a sunroof panel;

a frame which connects ends of the guide rails;

a driving unit which moves the sunroof panel;

at least one cable which connects the driving unit and the sunroof panel;

at least one guide pipe which is arranged in a guide pipe groove recessed in the frame and covers the at least one cable; wherein a bank part is formed extending obliquely upward from one of side walls of the guide pipe groove, and a bottom part of the guide pipe groove corresponding to the bank part comes in surface contact with an outer circumferential surface of a lower part of the guide pipe and the bank part comes in surface contact with a part of an outer circumferential surface of an upper part of the guide pipe, wherein a pair of cutout areas which divide the guide pipe groove is formed on opposite sides of the guide pipe groove corresponding to the bank part in a longitudinal direction of the guide pipe groove, a slit is formed along the longitudinal direction of the guide pipe groove corresponding to the bank part, and the guide pipe groove elastically holds the guide pipe by means of the pair of cutout areas and the slit.

6. The holding structure of the guide pipe of the sunroof apparatus according to claim 5, wherein the bank part is formed on an outer edge of the guide pipe groove which is formed to be curved.

7. The holding structure of the guide pipe of the sunroof apparatus according to claim 5, wherein an inclined surface which is inclined in a direction in which an opening of the guide pipe groove becomes larger is formed on the other one of the side walls, and the at least one guide pipe is arranged in the guide pipe groove through the opening of the guide pipe groove between the bank part and the inclined surface.

8. The holding structure of the guide pipe of the sunroof apparatus according to claim 6, wherein an inclined surface which is inclined in a direction in which an opening of the guide pipe groove becomes larger is formed on the other one of the side walls, and the at least one guide pipe is arranged in the guide pipe groove through the opening of the guide pipe groove between the bank part and the inclined surface.

* * * * *